Feb. 19, 1935.  F. P. DEMPSEY  1,991,494
THREAD CUTTING TOOL
Filed April 6, 1931
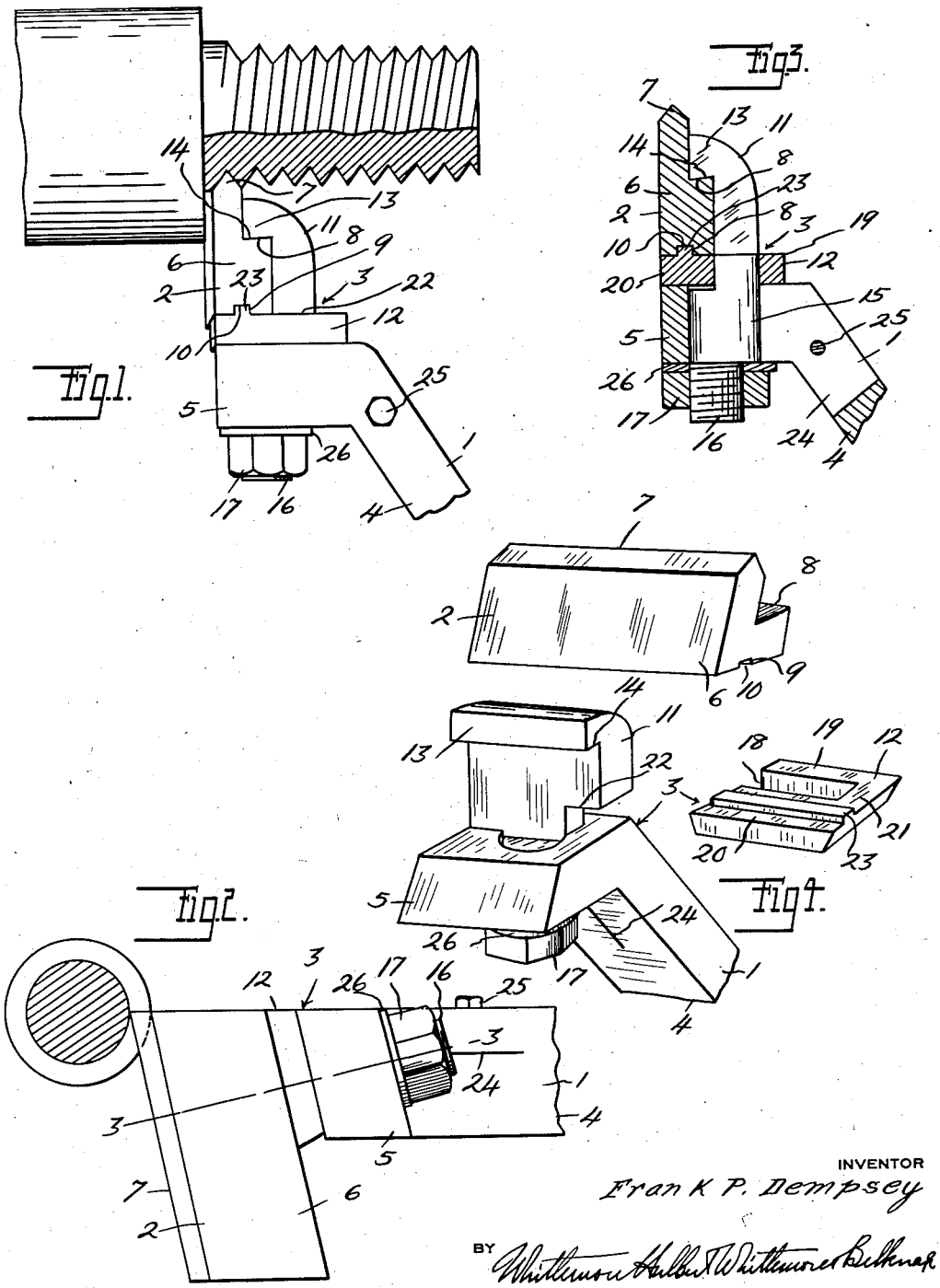
INVENTOR
Frank P. Dempsey
BY
ATTORNEYS Patented Feb. 19, 1935

1,991,494

UNITED STATES PATENT OFFICE 1,991,494

THREAD CUTTING TOOL

Frank P. Dempsey, Detroit, Mich.

Application April 6, 1931, Serial No. 528,203

3 Claims. (Cl. 29—98)

The invention relates to thread cutting tools and has for some of its objects to so construct the tool that the blade may be adjusted to cut a thread of any desired pitch; to so construct the tool that it may cut a thread to a point closely adjacent a shoulder upon the work; to so construct the tool that the cutting portion of the blade may be readily and quickly sharpened; and to so construct the tool that the blade may be readily adjusted relative to the holder and clamped in place. Another object is to provide a simple, compactly arranged construction embodying the above features.

These and other objects of the invention will become apparent from the following description taken in connection with the accompanying drawing, in which Figure 1 is a plan view of a thread cutting tool, showing an embodiment of my invention;

Figure 2 is a side elevation thereof;

Figure 3 is a cross section on the line 3—3 of Figure 2;

Figure 4 is a perspective view with the parts separated.

The thread cutting tool illustrating an embodiment of my invention has the holder 1, the blade 2 and the device 3 for clamping the blade to the holder. The holder comprises the shank 4 and the transverse blade supporting portion 5 at the outer end of the shank. The blade 2 has the body 6 which extends transversely of the supporting portion 5 of the holder and has the outer cutting edge 7 engageable with the work to cut a thread. The inner edge of the body is substantially parallel to the outer cutting edge and the inner portion of the body is of greater thickness than the outer portion, which latter is provided with the cutting edge. This inner portion projects beyond one side face of the outer portion and has the outer face 8 which is inclined inwardly toward the inner edge of the body from the side face of the inner portion to the side face of the outer portion. The inner portion of the body is also provided with the shoulder 9 which extends longitudinally of the body and parallel to its side faces. This shoulder 9 is formed in the present instance by means of the longitudinally extending groove 10.

The clamping device 3 comprises the cooperating side and base clamping members 11 and 12, respectively. The side clamping member has at its outer edge the overhanging portion 13 which is under cut to provide the inner inclined face 14 for engaging the outer inclined face 8 of the blade. The side clamping member also has the cylindrical pivot portion 15 which extends through the blade supporting portion 5 of the holder and is journalled therein. This pivot portion terminates in the threaded portion or stud 16, which is engageable by the nut 17 at the inner or rear side of the blade supporting portion. The base clamping member 12 is U-shaped and embraces the portion of the side clamping member 11 outwardly beyond the pivot portion 15. The base clamping member specifically has the longitudinally extending slot 18 which forms the longitudinal arms 19 and 20 and the cross arm 21 connecting corresponding ends of these longitudinal arms. The arms 19 and 20 are adapted to be located at opposite sides of the side clamping member and the cross arm 21 is adapted to be located beneath the inner edge portion 22 of the side clamping member. The longitudinal arm 20 of the base clamping member is provided with the longitudinally extending rib or bead 23 which is engageable in the longitudinally extending groove 10 of the blade 2 and which serves with the overhanging under cut edge portion of the side clamping member to form an under cut guideway for receiving the blade and preventing the same from being laterally disengaged therefrom.

The outer face of the blade supporting portion 5 of the holder is preferably downwardly and inwardly inclined to provide the required frontal clearance for the cutting edge of the blade. Furthermore, the shank 4 of the holder and the adjacent part of the blade supporting portion 5 are preferably longitudinally split, as by means of the saw cut 24 and the cap bolt 25 is provided passing through the portion above the split and threaded into the portion below the split for reducing the diameter of the transverse hole in the blade supporting portion in which is journalled the pivot portion 15 of the side clamping member. The spring washer 26 is preferably provided between the clamping nut 17 and the blade supporting portion 5 of the holder.

It will be seen that the construction is such that the clamping members for the blade do not extend beyond one side face of the blade so that they leave an unobstructed space at this side face, whereby the tool may cut a thread upon the work up to a point closely adjacent a shoulder upon the work. These clamping members and the blade are rotatable parallel to the outer face of the blade clamping portion of the holder and may be adjusted to various angular positions relative to the holder so that the blade may cut a right or a left hand thread of any desired pitch. Furthermore, the base clamping member has an extended bearing against the outer face of the blade clamping portion of the holder so that when the clamping members have been angularly adjusted to position the blade at any desired angle relative to the holder these clamping members may be tightened in place by tightening up the clamping nut without disturbing the angular adjustment. Furthermore, if the cutting portion of the blade becomes dull, this blade may be readily removed from the clamping members and the holder by loosening up the clamping nut, after which the upper edge of the blade may be ground to provide a new cutting portion and the blade then reinserted at the proper height and again clamped in place.

What I claim as my invention is:

1. A thread cutting tool, comprising a holder having a blade supporting portion, relatively movable clamping members comprising a base member and a side member, said side member having a portion extending through said supporting portion and said base member being U-shaped and detachably embracing a portion of said side member, a blade engaging said base and side members, and means engaging the portion of said side member extending through said supporting portion for clamping said base and side members upon said blade and said base member upon said supporting portion.

2. A thread cutting tool, comprising a holder having a blade supporting portion, a blade having a body provided with an outer longitudinally extending portion having an outer longitudinally extending cutting edge and an opposite inner portion of greater thickness than said outer portion, said inner portion projecting laterally beyond one side of said outer portion and having an inclined outer face and also a groove in its inner edge, an angularly adjustable clamping member extending along the side of said laterally projecting part and having an inclined portion having clamping engagement with said outer face and a second portion extending transversely of and rotatably through said supporting portion, a projection rotatable with said clamping member and engaging said groove, said projection and inclined portion of said clamping member guiding said blade, and means engaging said second portion of said clamping member at the side of said supporting portion opposite said blade for securing said inclined portion of said clamping member against said inclined outer face of said blade and also securing said clamping member and blade to said supporting portion.

3. A thread cutting tool, comprising a holder having a blade supporting portion, a blade having a body provided with an outer longitudinally extending portion having an outer cutting edge and an inner portion of greater thickness than said outer portion, said inner portion projecting laterally beyond one side of said outer portion, an angularly adjustable clamping member rotatably mounted on said supporting portion and extending along the side of said laterally projecting part and having a portion extending over and in clamping engagement with the outer face thereof, means rotatable with said clamping member and engaging the inner edge of said inner portion and serving with said first mentioned portion of said clamping member to guide said blade, and means for clamping said clamping member to said supporting portion and thereby clamping said blade in place.

FRANK P. DEMPSEY.